Figure 1:
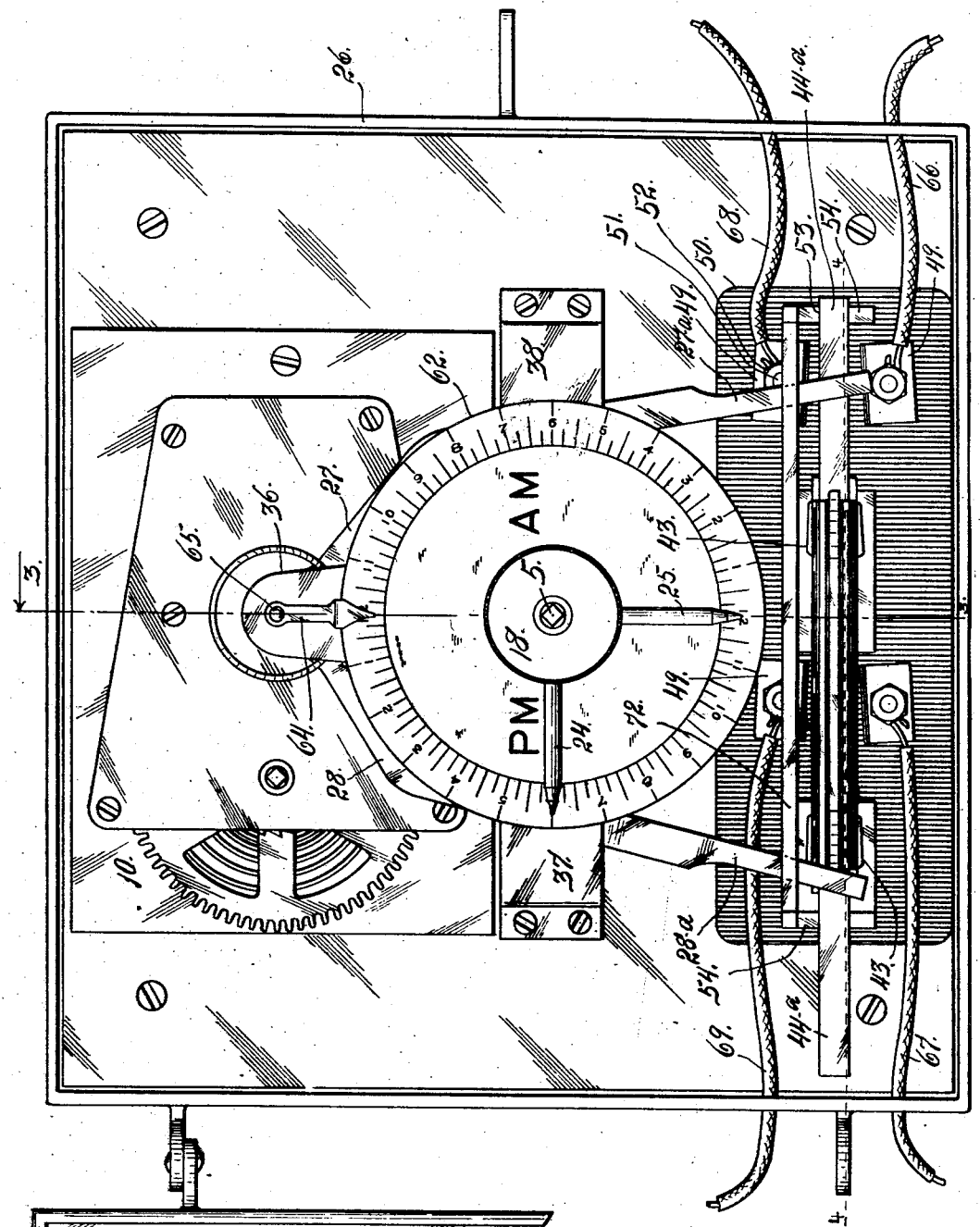

R. W. LAWSON & H. B. SNELL.
AUTOMATIC TIME SWITCH.
APPLICATION FILED JAN. 24, 1910.

989,527.

Patented Apr. 11, 1911.

4 SHEETS—SHEET 1.

R. W. LAWSON & H. B. SNELL.
AUTOMATIC TIME SWITCH.
APPLICATION FILED JAN. 24, 1910.

989,527.

Patented Apr. 11, 1911.

4 SHEETS—SHEET 3.

Witnesses
Otto E. Hoddick.
J. D. Thornburgh.

Inventors
R. W. Lawson.
H. B. Snell.
By O'Brien, Attorney

R. W. LAWSON & H. B. SNELL.
AUTOMATIC TIME SWITCH.
APPLICATION FILED JAN. 24, 1910.

989,527.

Patented Apr. 11, 1911.

4 SHEETS—SHEET 4.

Witnesses
Otto E. Hoddick.
J. D. Thornburgh.

Inventors
R. W. Lawson.
H. B. Snell.
By C. J. O'Brien. Attorney

UNITED STATES PATENT OFFICE.

RUDOLPH W. LAWSON AND HARRY B. SNELL, OF DENVER, COLORADO, ASSIGNORS OF ONE-HALF TO FRED W. THOMPSON, OF DENVER, COLORADO.

AUTOMATIC TIME-SWITCH.

989,527.  Specification of Letters Patent.  Patented Apr. 11, 1911.

Application filed January 24, 1910. Serial No. 539,857.

*To all whom it may concern:*

Be it known that we, RUDOLPH W. LAWSON and HARRY B. SNELL, citizens of the United States, residing in the city and county of Denver and State of Colorado, have invented certain new and useful Improvements in Automatic Time-Switches; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in automatic time switches.

Our improved construction is adapted to automatically make and break an electric circuit at predetermined intervals. The construction can be so set that an electric-lighting circuit may be closed at any desired hour of the day or night and automatically broken at any desired subsequent time, the whole mechanism being entirely automatic and only requiring that it shall be wound up at proper intervals. The mechanism includes two spring-held lever arms arranged to be acted upon by cams which serve to separate the arms and prevent them except at stated intervals, from acting upon the movable member of a circuit-make-and-break device located in the lighting circuit. These cams are so arranged that when one of them is moved sufficiently to release one of the lever arms, the latter, acted on by its spring, will move suddenly against the movable member of the make-and-break device and shift the latter sufficiently to close the circuit, the operation being quickly accomplished to avoid arcing. This, however, will not occur until the predetermined time has arrived. The other cam is arranged to act upon the other arm of the mechanism and hold the latter away from the movable member of the circuit-make-and-break device until the cam releases the said arm, when the latter will move in response to the recoil of its spring, and strike the movable member of the circuit-make-and-break device with sufficient force to break the circuit and extinguish the lights. The switch mechanism includes a rotatable post or spindle acted on by a coil spring, the spindle being free to rotate when the spring is under tension. The two cams while loose upon the spindle are arranged to travel therewith when the device is in operation, since the cams and other parts are held together to rotate in unison through the instrumentality of a nut which is adapted to be quickly tightened sufficiently for the purpose. When this nut is loosened the cams may be so adjusted with reference to the spring-actuated arms upon which they act, that the said arms may be released to make and break the electric circuit at such times as may be desired.

The time switch mechanism is connected in operative relation with a clock movement, whereby the mechanism is accurately regulated and the movement of the cams retarded to harmonize with the movement of the clock mechanism for obvious reasons.

Having briefly outlined our improved construction, we will proceed to describe the same in detail, reference being made to the accompanying drawing in which is illustrated an embodiment thereof.

Figure 2:
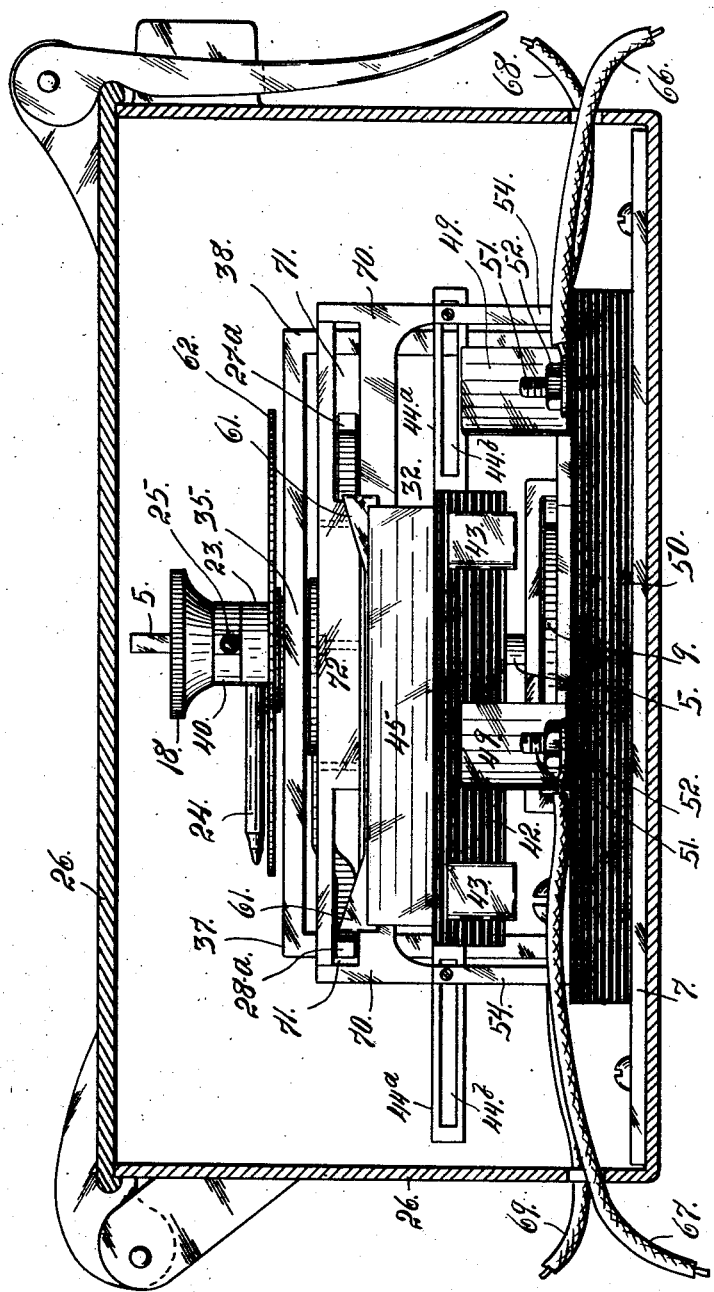
Figure 3:
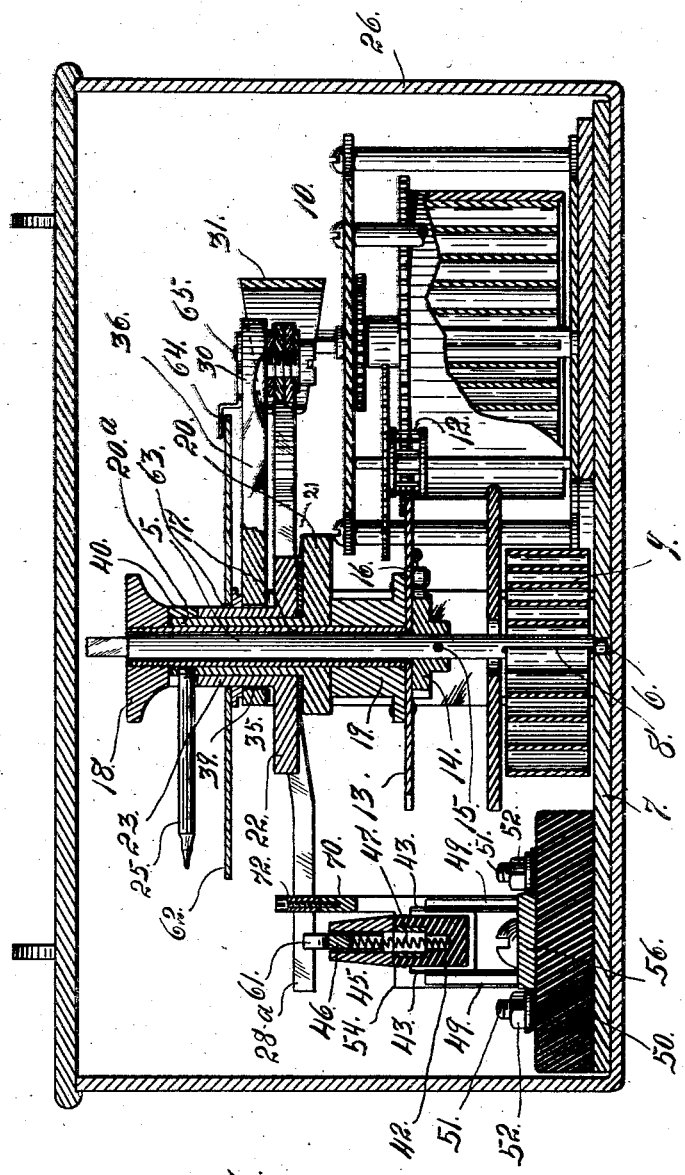
Figure 4:
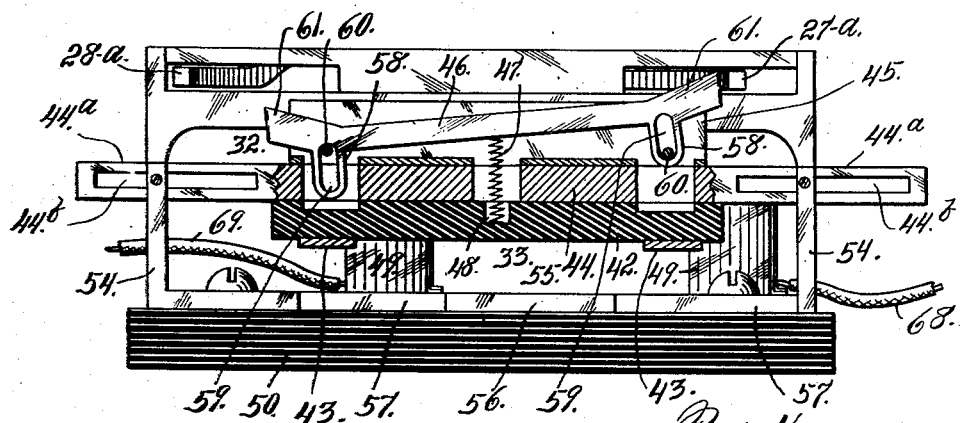
Figure 5:
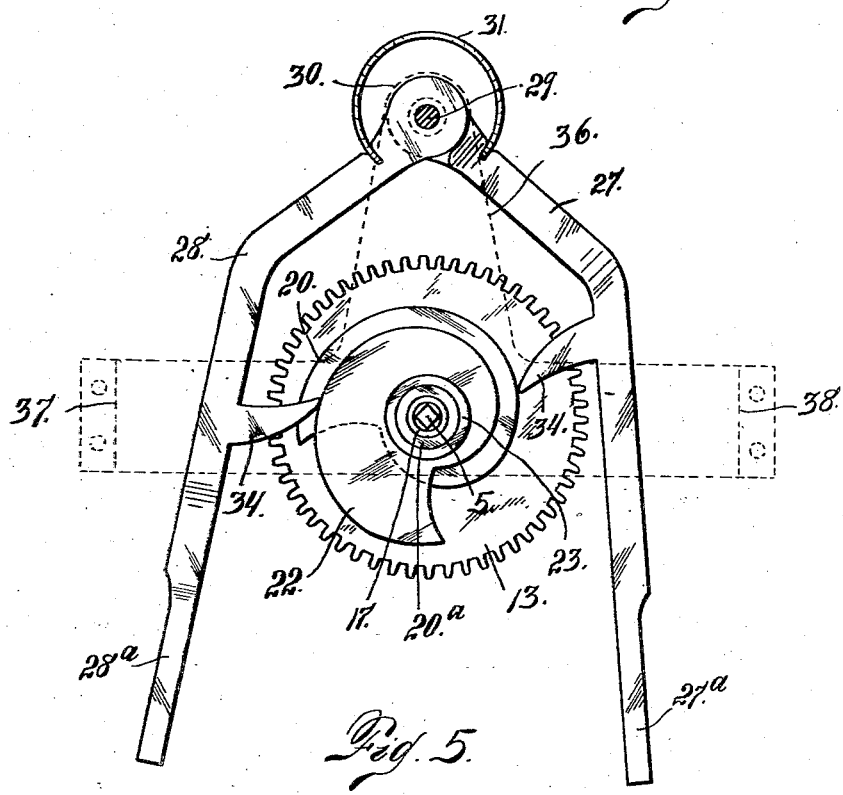

In this drawing: Figure 1 is a top plan view of our improved time switch complete, or shown in connection with the clock mechanism. Fig. 2 is a side elevation of the same with the casing shown in section. Fig. 3 is a section taken through the mechanism on the line 3—3, Fig. 1; looking toward the left, or in the direction of the arrow adjacent said line. Fig. 4 is a side elevation partly in section illustrating our improved device. The sectional part of this view is taken on the line 4—4, Fig. 1. Fig. 5 is a top plan view of the actuating lever arms shown in connection with the cams which serve to prevent the movement of the arms for regulating the electrical circuit.

The same reference characters indicate the same parts in all the views.

Let the numeral 5 designate a spindle which, it may be assumed, occupies a vertical position, though it must be understood that the mechanism will run equally well regardless of the position which it occupies. This spindle is journaled as shown at 6 in a base plate 7. The lower extremity of the spindle 5 is connected as shown at 8 with a coil-spring 9, whose opposite extremity is connected with a suitable stationary support. At the right of the spindle 5, referring to Fig. 3, is located a clock mechanism 10 having a wheel or pinion 12 connected in operative relation with a gear 13 surrounding the spindle 5 and resting on a ratchet wheel 14 made fast to the spindle as shown at 15. The gear 13 has a dog or pawl 16 which is secured to the said gear and engages the ratchet wheel 14 whereby the movement of the spindle in response to the spring 9 is retarded to harmonize with the movement of the clock mechanism for properly registering the time of day.

Surrounding the spindle 5 and extending above the gear 13 is a sleeve 17 whose upper extremity extends beyond the mechanism and is threaded to receive a clamping nut 18. Located above the gear 13 and secured thereto is a sort of hub 19 which surrounds the sleeve 17 and forms a support for a cam 20 having an upwardly projecting sleeve $20^a$ surrounding the sleeve 17. Located above the cam plate 20 and separated therefrom by a washer 21 is a cam plate 22 having an upwardly projecting sleeve 23 surrounding the sleeve $20^a$.

Connected with the cam sleeves $20^a$ and 23 are two pointers designated 25 and 24 respectively, which protrude above the mechanism and are exposed when the casing 26 is opened, whereby access is given to the operator for setting the cams with reference to the spring actuated lever arms 27 and 28 which are connected by a pivot pin 29 mounted on a part 30 of the framework, the said framework construction being indicated by dotted lines in Fig. 5. The two arms 27 and 28 are held under tension by a circular leaf spring 31 whose opposite extremities are embedded in the arms 27 and 28 respectively, whereby the said arms when acted on by the said cams are placed under sufficient tension to actuate the movable member 32 of the circuit-make-and-break device 33. Each arm 27 and 28 has an inwardly projecting tooth 34, these teeth of the two arms being respectively acted on by the cams 20 and 22 of the time switch mechanism.

Above the cam 22 is located the upper portion 35 of the framework, consisting of three intersecting members 36, 37 and 38, the intersecting portions of the said members forming a sort of hub having an opening 39 of sufficient size to accommodate the spindle 5, the sleeve 17 and the cam sleeves $20^a$ and 23, all of which rotate with the spindle when the clamping nut 17 is tightened.

Interposed between the clamping nut 18 and the upper extremity of the sleeve 23, is a ring 40 which surrounds the upper part of the cam sleeve $20^a$ and projects slightly above the same, whereby the tightening of the nut acting upon the ring locks the entire mechanism which surrounds the spindle in such relation that all of the said parts rotate with the spindle whereby the cams are caused to act upon the spring-actuated lever arms.

The arrangement of the cams, with reference to the teeth 34 of the lever arms, is such that one of these teeth is in the plane and therefore in the path of the cam 20, while the other tooth is in the plane and therefore in the path of the cam 22. By loosening the clamping nut 18, the cams may be so set that any desired time will elapse before either cam will release its corresponding tooth 34 and allow the arm 27 or 28, as the case may be, to move inwardly and actuate the movable member 32 of the make-and-break device 33. This movable member consists of an insulating base 42; two metal contacts 43; a metal bar 44; a channel member 45; and a striking bar 46, the latter being located within the groove of the channel bar and supported by a centrally located coil-spring 47, the upper extremity of the spring engaging the center of the bar while its lower extremity is seated in a recess 48 formed in the insulating base 42.

The contacts 43 are mounted upon the insulating member 42 and are adapted to engage coöperating contacts 49 which are secured to the insulating base 50 by screws or bolts 51 to which are applied securing nuts 52. The contacts 43 are U-shaped and have upwardly projecting parts engaging both sides of the insulating member 42 of the movable make-and-break device. The said upwardly projecting members being connected underneath the insulating member. The coöperating contacts 49 are also double and engage both sides of the contacts 43 when the movable member is shifted to close the circuit. These last named contacts, however, are insulated from each other except when the movable member of the make-and-break device is shifted to cause the contacts 43 to engage the contacts 49, in which event the contacts 43 bridge the spaces between the two pairs of contacts 49, thus closing the circuit at two points.

The bar 44 of the make-and-break device is provided with end extensions $44^a$ which are slotted as shown at $44^b$. These extensions engage guide grooves 53 formed in the upwardly projecting end members 54 of a U-shaped angle bracket 55, the end members being onnected by a longitudinally disposed base member 56 notched on opposite sides as shown at 57, to receive one member of each pair of stationary contacts 49. These contacts 49 are only shown in Fig. 4 on the farther side of the base 56, though the angle bracket 55 appears in side elevation in this view.

The striking pin or bar 46 is provided with two depending ears 58 slotted as shown at 59 to receive pins 60, which connect the two parts of the channel member 45 of the movable element of the circuit-make-and-break device. Normally the spring 47 supports the striking pin 46 in a horizontal or approximately horizontal position and raised as high as the stop pins 60 will permit. In this event the extremities 61 which are inclined slightly upwardly from the slotted lugs 58, lie in the path of the outer extremities 27ª and 28ª of the spring-actuated lever arms 27 and 28. Now when the machine is in operation, the cams 20 and 22 act to force the lever arms 27 and 28 outwardly placing the spring 31 under tension. These cams may be so arranged that either arm 27 or 28 may be forced outwardly against the tension of the spring 31, to the maximum degree permitted by the cam and then released at any predetermined time. When the mechanism is properly set, one of the lever arms will be forced outwardly and released to act upon one extremity of the striking bar 46, thereby tilting the opposite extremity of the striking bar downwardly to pass under the other lever arm and force the movable member of the make-and-break device into the circuit-closing position; while the other cam will force the other lever arm outwardly against the tension of its spring beyond the limit of movement of the striking bar 46, thus allowing the said bar to be raised to the approximate horizontal position under the influence of the spring 47 and in a position to be acted on by the arm, which is released by the cam at the required predetermined time for the purpose of breaking the circuit and extinguishing the lights.

In order to make it practicable to accurately set the mechanism so that the circuit shall be automatically closed at a predetermined time for the purpose of turning on lights for instance, and automatically broken at a subsequent predetermined time, for the purpose of breaking the circuit and extinguishing the lights, a graduated dial 62 is employed. This dial is movably mounted, being provided with an opening 63 through which the cam sleeve 23, as well as the sleeve 20ª and the sleeve 17, passes. This dial is freely adjustable and is marked with figures indicating 24 hours, the figures on one side of the dial, namely, those on the right hand side (see Fig. 1), indicating a. m. time, that is to say, from 12 o'clock midnight to 12 o'clock noon; while the figures on the opposite of left hand side of the dial, indicate p. m. time, or from 12 o'clock noon to 12 o'clock midnight.

A pointer 64 is secured to the framework by a pin 65, which also forms the pivot which connects the lever arms 27 and 28. This stationary hand or pointer is so arranged that any mark on the dial 62 may be brought into alinement therewith. For instance, if it is desired to turn the lights on at 6 p. m. and to turn them off at 12 o'clock midnight; and assuming that the time when the mechanism is set is 12 o'clock noon, the figure 12 on the dial 62, indicating noon, will be turned to the center of the pointer 64, while the pointer pin 24 connected with the sleeve of one cam will be turned to the figure 6, indicating p. m. time, while the pointer pin 25 connected with the sleeve of the other cam will be turned to indicate 12 o'clock midnight. During the adjustment of the pins 25 and 24 which regulate the cams 20 and 22, respectively, the clamping nut 18 should be loosened. However, after this adjustment, this nut should be tightened, whereby the cams are frictionally interlocked with the spindle and the rotation of the latter imparted by the spring 9, operates the cams and imparts a corresponding movement to the pointer pins 24 and 25. The mechanism is so constructed that when the dial 62 and pointer pins are regulated, as heretofore explained, and as illustrated in Fig. 1 of the drawing, that when the pointer pin 24 has traveled from the figure 6 at the left of the dial to the 12 o'clock figure at the top of the dial, the lights will be turned on, that is to say, just six hours after the time when the mechanism was adjusted, since during that time the cam with which the pointer 24 is connected has moved far enough to release the spring-actuated lever arm 28ª, whereby the said arm under the influence of the spring 31 moves quickly toward the right and acts upon the left hand extremity of the striking pin, (see Figs. 1, 2 and 4) and shifts the movable member 32 of the circuit-make-and-break device 33, sufficiently to bring the contacts 43 into engagement with the coöperating contacts 49, thus closing the circuit. In explaining the path of the current (see Fig. 1), the exterior circuit wires or conductors may be designated by the numerals 66 and 67 and it may be assumed that these wires are connected with the opposite poles of the source of current. The internal circuit wires or conductors are designated 68 and 69 and it may be assumed that the lights of the building are supplied with current from these wires. If it be assumed that the current enters the switch through the conductor 66, it will pass to one of the contacts 49 and thence through one of the U-shaped contacts 43 to the other contact 49 and thence through the conductor 68 to the lights of the building, returning through the conductor 69 to a contact 49 of the left hand pair of contacts, and thence through the left hand contact 43 to the other coöperating contact 49 and thence through the wire or conductor 67 to the other pole of the source, completing the circuit. Then as the operation of the mechanism continues, and the pointer 25 has traveled from the 12 number at the bottom of the dial to the 12 number at the top of the dial or where the stationary pointer 64 is located, the other cam will have traveled a sufficient distance to release the other spring-actuated arm, namely, that designated 27ª, and the latter will travel quickly toward the left and act upon the right hand extremity of the striking-bar 46, and shift the movable member of the make-and-break device sufficiently to disengage the contacts 43 from the coöperating contacts 49, whereby the circuit is broken, and the lights automatically turned off at the proper time.

In further explanation of the mechanism, it may be stated that the gear 13 of the mechanism surrounding the spindle 5, is so connected with the pinion 12 of the clock mechanism, that the said spindle is given one complete rotation every twenty-four hours, whereby each of the pointer pins 25 and 24, together with the cams 20 and 23, with which they are respectively connected, is also given a complete rotation every twenty-four hours, when the mechanism is in constant use.

From what has already been explained, it will be understood that the hour when the mechanism is set, as indicated by the figures or graduations on the dial 62, must always be turned to the stationary pointer 64, one of the pointer pins being set to point toward the figure on the dial indicating the hour or time when the lights are to be turned on; while the other pointer pin points toward the hour or the time when the lights are to be turned off. Then when one pointer pin travels into alinement with the stationary pointer, the lights will be turned on, while when the other pin has traveled far enough to assume the same position, the lights will be turned off. It will thus be noted that the pointer pins should be so arranged with reference to the dial that one pin must travel far enough around the dial to measure the time or number of hours from the time the mechanism is set to the time that the lights are to be turned on; while the other pointer pin must travel a sufficient distance to measure the number of hours between the hour or time that the mechanism is set, to the time that the lights are to be turned off.

The function of the spring 9 is to furnish sufficient power to impart movement to the spindle 5 and its attachments, while the function of the clock mechanism is to limit the movement of the spindle and its attachments so that the said parts shall move in harmony with the clock mechanism, whereby the pointed pins 24 and 25 shall accurately measure time upon the dial 52. In other words, each pointer pin will make a complete rotation or revolution in 24 hours of time, and if it is desired to set the mechanism so that the light circuit shall be closed at a predetermined time and broken at a subsequent predetermined time, the pointers are so set with reference to the time when they are set, so that each shall measure on the dial in traveling from its location of adjustment, the exact time which must elapse before the circuit shall be closed in the one case, and broken in the other case.

The front portion of the frame extends above the bar 42 of the movable member of the make-and-break device, as shown at 70 and is recessed as shown at 71 to receive the forward portions of the lever arms 27 and 28. These recesses 71 are closed at the top by a bar 72 whose central portion rests upon the top of the forward part of the frame, its extremities being recessed or cut away to harmonize with the recesses 71, and to make room for the movement of the lever arms. This construction of the framework forms guides for the lever arms.

Having thus described our invention, what we claim is:

1. In a time switch, the combination with a make-and-break device having a movable member mounted to reciprocate, of spring-actuated lever arms positioned at the opposite ends of the movable member, the movable member having a striking bar lying in the path of said arms and arranged to rock on said member, cams mounted to rotate and arranged to act on the said arms whereby the latter are first operated to increase the tension of the actuating spring, the cams being adjustable to release the lever arms at predetermined intervals, means for rotating the cams, and clock mechanism connected to regulate the movement of the cams in synchronism with the clock mechanism, substantially as described.

2. In a time switch, the combination of a make-and-break device having a movable member mounted to reciprocate and equipped with a spring-supported striking bar mounted to rock in said member, spring-actuated lever arms having portions occupying positions beyond the opposite ends of the striking bar member of the make-and-break device, the said member lying in the path of the said arms, cams arranged to act upon the respective arms whereby the actuating spring is first placed under tension, the cams being arranged to release the said arms at predetermined separated intervals whereby the first arm which is released acts upon the striking bar to shift the movable member of the make-and-break device, the opposite end of the striking bar being thrust downwardly to pass out of the path of the other arm, means for rotating the cams, and clock mechanism connected in operative relation with said means, for the purpose set forth.

3. A time switch, comprising a circuit-make-and-break device having a movable member mounted to reciprocate, a striking bar mounted to rock on said movable member, means alternately engaging the extremities of the said striking bar for automatically imparting movement alternately in opposite directions to the movable member of the make-and-break device at predetermined intervals, and clock mechanism for regulating the operating mechanism of the movable member of the make-and-break device, substantially as described.

4. A time switch, comprising a circuit-make-and-break device having a movable member mounted to reciprocate and including a striking bar having a centrally located yielding support, the bar being free to rock on said support, means for limiting the upward movement of its extremities under the influence of the said support, spring actuated lever arms positioned adjacent the striking bar, adjustable cams arranged to act upon said arms to move them outwardly against their spring and then release them, the extremities of the striking bar occupying positions in the path of the said arms, the cams being arranged to release the arms at predetermined intervals, means for actuating the cams, and clock mechanism for regulating their movement, for the purpose set forth.

5. A time switch, comprising a circuit-make-and-break device having a movable member mounted to reciprocate to make and break the circuit, the movable member having a striking bar provided with a centrally located yielding support, the extremities of the striking bar having slotted ears, pins mounted in the movable member and passing through the slots of the said ears to limit the upward movement of the striking bar extremities, whereby the said striking bar is so mounted that when force is applied to either extremity thereof the opposite extremity will be depressed, and spring-actuated lever arms arranged adjacent the striking bar, means for controlling said arms whereby they are alternately released at predetermined intervals to cause them to act upon the opposite extremities of the striking bar for the purpose of shifting the movable member, and clock mechanism for regulating the action of the controlling means.

6. A time switch, comprising a circuit-make-and-break device having a movable member provided with a spring-supported striking bar mounted to rock within the said member, the extremities of the striking bar being normally supported above the body of the movable member, spring-actuated lever arms arranged adjacent the striking bar, the extremities of the striking bar lying in the path of the arms during the movement of the latter, and cams arranged to act upon the said arms and alternately release the same at predetermined intervals, means for actuating the cams, and clock mechanism for regulating the actuating means.

7. A time switch, comprising a circuit-make-and-break device, including a reciprocating member, spring actuated arms for imparting movement to the said member in opposite directions, the movable member having a striking bar lying in the path of the said arms and arranged to rock on the said member, cams for actuating and alternately releasing the said arms to allow them to act upon the movable member of the make-and-break device, means for operating the cams, clock mechanism for controlling the cam actuating mechanism, and means for adjusting the cams to cause them to alternately release the actuating arms at predetermined intervals, substantially as described.

8. A time switch, comprising a circuit-make-and-break device, spring actuated arms arranged adjacent the circuit-make-and-break device, the latter having a member lying in the path of the said arms and mounted to rock to allow one extremity to move downwardly and pass out of the path of one arm, while the other arm is acting upon its opposite extremity, cams for acting upon the said arms, the cams being adjustable to permit the release of the arms alternately and at predetermined intervals, means for actuating the cams, and clock mechanism independent of the cam actuating mechanism for regulating the latter to act in harmony with the clock mechanism whereby the movement of the movable member of the circuit-make-and-break device may be properly timed, substantially as described.

9. A time switch, comprising a circuit-make-and-break device, including a movable member mounted to reciprocate, spring-actuated arms arranged adjacent the movable member, the latter having a striking bar lying in the path of the arms and arranged to rock the said movable member, cams arranged to act upon the said arms and alternately release the same to allow them to act upon the movable member of the circuit-make-and-break device, a spindle upon which the cams are loosely mounted, the cams having independent sleeves, pins connected with the sleeves of the cams for purposes of adjustment, means for locking the cams to rotate with the spindle, a dial graduated for time indicating purposes and co-operating with the said pins, means for actuating the spindle, and clock mechanism connected in operative relation with the spindle to cause the latter to move in synchronism with the clock mechanism, substantially as described.

10. A time switch, comprising a circuit-make-and-break device, including a reciprocable member having a striking member arranged to rock thereon, means adapted to engage the striking member for actuating the said member, and clock mechanism connected in operative relation with the actuating means to cause the latter to move in synchronism with the clock mechanism, substantially as described.

11. A time switch, comprising a circuit-make-and-break device having a reciprocable member, spring actuated arms arranged adjacent said member having a striking bar, the said member lying in the path of the movement of said arms arranged to engage one arm at a time, means acting on the arms to release the same alternately at predetermined intervals, means for operating the arm-releasing means, and clock mechanism connected in operative relation with the said operating means, for the purpose set forth.

In testimony whereof we affix our signatures in presence of two witnesses.

RUDOLPH W. LAWSON.
HARRY B. SNELL.

Witnesses:
JESSIE F. HOBART,
A. EBERT O'BRIEN.